United States Patent [19]

Flickinger

[11] Patent Number: 4,914,558

[45] Date of Patent: Apr. 3, 1990

[54] SERIES RESONANT INVERTER AND METHOD OF LAMP STARTING

[76] Inventor: Jon Flickinger, 314 Irene St., Salina, Kans. 67401

[21] Appl. No.: 319,327

[22] Filed: Mar. 6, 1989

[51] Int. Cl.[4] .............................................. H02M 3/335

[52] U.S. Cl. .......................................... 363/17; 363/56; 363/98; 363/132; 363/49; 315/DIG. 7

[58] Field of Search ..................... 363/17, 56, 98, 132, 363/133, 134, 37, 49; 315/DIG. 2, DIG. 5, DIG. 7

[56] References Cited

U.S. PATENT DOCUMENTS 3,248,640 4/1966 Wellford .
4,017,785 4/1977 Perper .................................... 321/4
4,042,855 8/1977 Buenzli .
4,109,307 8/1978 Knoll .
4,184,128 1/1980 Nilssen .
4,375,608 3/1983 Kohler .
4,388,562 6/1983 Josephson ........................... 315/205
4,396,866 8/1983 Bay et al. .
4,461,980 7/1984 Nilssen .
4,503,363 3/1985 Nilssen .......................... 315/DIG. 7
4,525,650 6/1985 Hicks et al. ................... 315/DIG. 7
4,541,041 9/1985 Park et al. ............................ 363/98
4,581,562 4/1986 Nilssen ................................ 315/219
4,633,381 12/1986 Upadhyay ............................ 363/56
4,652,797 3/1987 Nilssen .
4,663,571 5/1987 Nilssen .
4,712,045 12/1987 Van Meurs ................... 315/DIG. 7

*Primary Examiner*—Peter S. Wong

*Attorney, Agent, or Firm*—Pollock, Vande Sande & Priddy

[57] ABSTRACT

The method of starting fluorescent lamps includes energizing the lamp and its filaments, in a cold condition, with voltages and currents considerably in excess of (and integer multiples of) normal operating parameters. This high power is supplied for either a predetermined time (on the other of 100 milliseconds) or until lamp starting is sensed. The power conditioning electronics improves the power factor by using normal inverter current to charge a capacitor so that, as full wave rectified voltage from a bridge falls, current can be supplied to the inverter from the charged capacitor. The full wave bridge rectifier includes two diodes and two silicon controlled rectifiers, the latter energized by secondary windings of a transformer which carries current under normal inverter operating conditions. In the event that operating parameters of the inverter exceed a threshold, however, current through the primary of the transformer is shunted away, thus removing the triggering current from the SCRs. The SCRs as a result open circuit the bridge and as a consequence power is removed from the inverter to provide for shock protection. Manufacturability of the power conditioning electronics is improved by using a single saturable core to control the conduction duration of the switches in the inverter. The control arrangement inhibits conduction of a non-conducting one of the switches until the voltage in the series resonant circuit peaks.

18 Claims, 4 Drawing Sheets

FIG.3
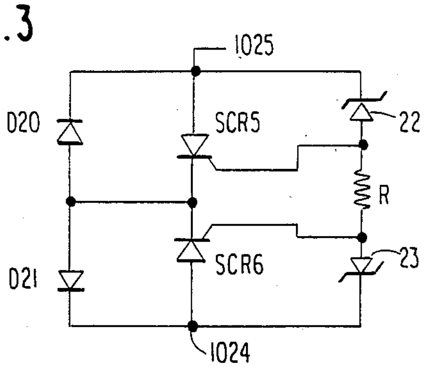
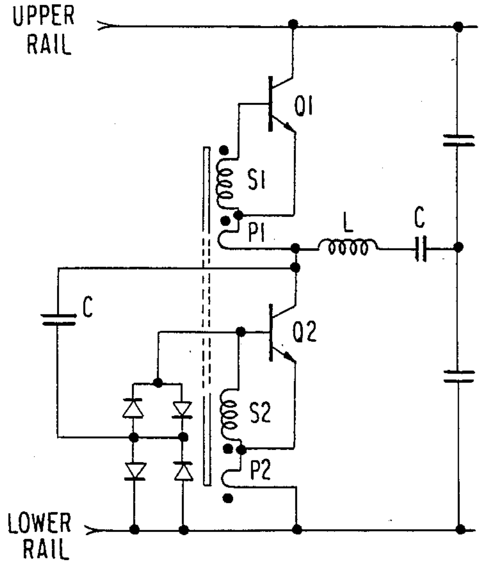
FIG.4
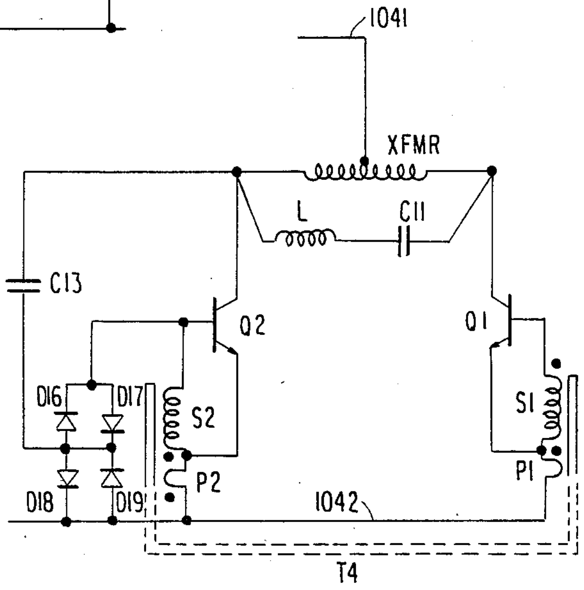
FIG.5

SERIES RESONANT INVERTER AND METHOD OF LAMP STARTING

TECHNICAL FIELD

The present invention relates to power conditioning electronics for supplying fluorescent lamps or the like.

BACKGROUND

Series resonant inverters, including series resonant inverters which are parallel loaded, are shown for example in the GE SCR Manual, 5th Edition, 1972, Section 13.2.1.1, page 354. Page 354 shows a Class A series resonant half bridge inverter which uses a Silicon Controlled Rectifier (SCR) as the electronic switch. The same reference, at page 390 (Section 13.3.2.4) describes current limiting. Needless to say, however, the circuits already referred to are capable of significant improvement.

One particular problem which was reflected in many prior art inverter circuits relates to the manufacturability of the circuit. More particularly, and especially with series resonant inverters, some control is needed to ensure that the two switches making up a half bridge conduct alternately and there is no period of time during which the switches conduct simultaneously. One technique described in Buenzli U.S. Pat. No. 4,042,855; Nilssen U.S. Pat. No. 4,184,128 and Wellford U.S. Pat. No. 3,248,640 is to use one or two saturable direct drive inductors with resonant current driven primaries to control the input drive of the switching elements. The inductors saturate during normal inverter operation to control the operating frequency and enhance the vacation of minority based carriers during the turn off transitions of the switching elements. This action improves the turn off speed and reduces excessive device dissipation. While this technique is effective, it tends to be difficult to implement in production because of the tight relationship between the inductor saturation time and the inverter's resonant frequency, especially when one takes into account the need to use components with reasonable tolerances. In order to operate properly (and not destructively) the inductors must saturate either slightly before the inverter's resonance period or exactly on the inverter's resonance. If allowed to saturate over a longer time than the resonance, the inverter will self-destruct due to conduction overlap of the switching devices. If too short a saturation time is used, inverter efficiency suffers. In normal production of such a design, normal variations in switching device parameters require "tweaking" or trimming of the resonant inductor and/or the turns on the saturable drive inductor.

The Wellford and Buenzli patents use a single saturating inductor connected directly across the bases of a push-pull inverter to evacuate the base minority carriers and control frequency. However, base drive is supplied by a resistor connected common secondary of the main inverter transformer and thus the common secondary conducts on both half cycles of the inverter. Nilssen describes a separate saturable inductor using primary windings which conduct on both half cycles of inverter operation.

Another problem with prior art power conditioning electronics for driving fluorescent lamps is the power factor presented at the power input terminals. It should be apparent that as the power factor can be increased towards unity, more effective use of the input power is exhibited. Perper, in U.S. Pat. No. 4,017,784 and Knoll, in U.S. Pat. No. 4,109,307, describe using inverter feedback to achieve improved input current crest factor and power factor. Both designs use a feedback voltage and current which is in parallel with the normal load current to charge a storage capacitor which serves to supply energy to the inverter during times when the input voltage is below the stored voltage level. When the input voltage is above the stored voltage level, the inverter receives energy from the AC input signal and the storage capacitors are recharged. This technique, although improving power factor, carries a penalty in that since the load current and capacitor charging current are summed at the inverter output, additional power loss is realized in the switching devices as compared to an inverter operating without this feature.

The characteristics of typical inverters exhibited under noload conditions is such as to require some technique for providing shock protection. See Nilssen U.S. Pat. Nos. 4,461,980 and 4,663,571. The first-mentioned patent describes an inverter disabling means to protect the series resonant inverter from self-destruction due to high peak currents under no-load conditions which would exist if a lamp were removed during normal operation. Notwithstanding this technique, however, a problem of safety may arise due to the face that the inverter power supply lines are still connected to the inverter circuitry after any shut down is effected. Shut down is accomplished in the prior art by disabling the switching devices through various means while leaving the AC power lines energized.

Another perennial problem in power conditioning electronics for driving (so-called) rapid start fluorescent lamps is the issue of filament current, and moreover, the entire starting operation. In this type of fluorescent lamp, filament current is needed for starting purposes, in order to initiate ionization or arcing. However, once a lamp is started, there is no need for filament current. Many prior art power conditioning devices provide a switch (timed or tied to inverter voltage) to terminate filament current at an appropriate time. See for example Kohler U.S. Pat. No. 4,375,608; Josephson U.S. Pat. No. 4,388,562; Bay U.S. Pat. No. 4,396,866 and Nilssen U.S. Pat. Nos. 4,581,562 and 4,652,797. Over and above the issue of filament current control, however, is the more pressing distinction between the turn on phase of typical fluorescent lamps and incandescent lamps. Energizing an incandescent lamp produces a sharp, clean and pleasing transition in which light is almost instantaneously available. This contrasts sharply with the starting phase of many fluorescent lamps which is first delayed from the time the lamp is energized (the switch is thrown by the user) and then starting occurs with one or more flickers of light. It would be an advantage to provide a method for energizing a fluorescent lamp which exhibited the unenergized/energized transition which is identical to or more nearly like that exhibited by incandescent lamps.

SUMMARY OF THE INVENTION

The invention overcomes the foregoing and other deficiencies in the prior art.

The invention improves the prior power conditioning electronics for driving fluorescent lamp loads in a number of different respects, including improving manufacturability by using a single saturable core, which core area can be trimmed or tweaked to provide appropriate control over the conduction time of the various switches relative to the natural frequency of the series resonant circuit.

The present invention uses a single saturating direct drive inductor and separate drive primaries so connected as to conduct on alternate half cycles, thus forming a pseudo flipflop for each inverter half in order to provide independent switching control with a single inductor. The cross-sectional area of the core is chosen so that saturation time is too long, considering all component variations, thereby allowing the saturation time to be shortened by reducing the cross-sectional area of the core just enough to compensate for component tolerances.

Wellford discloses the use of a capacitor to limit the rate of change of voltage in an active element in order to reduce dissipation in that element. Nilssen describes the use of a limiting capacitor to hold off base conduction during the voltage change phase, but of course this device requires two inductors. This would make any trimming of the core area extremely difficult, since it requires trimming two core areas.

The present invention uses the current through this limit capacitor to effectively clamp and thereby prevent base drive from being present during the time the voltage on the active element is changing, allowing a single core to be used.

The present invention also provides for improvement in power factor by causing inverter current to flow through one of two parallel paths, either from one of the power rails or to the other power rail. One of the two parallel paths includes a capacitor coupled between the respective power rail and the series resonant circuit. The other parallel path includes an additional capacitor and a diode. Furthermore, in order to improve the power factor, there is an additional diode coupling the junction of the capacitor and diode already mentioned, to an appropriate one of the power rails. As a result, normal inverter current flow provides for charging both of the capacitors. When the full wave rectified AC, placed on the power rails, falls below the voltage presented by the appropriate one of the capacitors, the diode allows current to be supplied from the charged one of the capacitors to the appropriate power rail.

Accordingly, the present invention provides a means of achieving the advantages of high power factor without the attendant disadvantages of higher power losses due to parallel loading of the inverter by using the series current from the inverter to charge storage capacitors. In other words while the present inverter does employ storage capacitors as in the prior art, those capacitors are charged by the inverter current per se and there is no increase in inverter current due to charging these capacitors. Thus the power dissipation at the switching devices is not increased by the presence of the storage capacitors.

An auto shut down circuit senses a parameter (such as voltage) in the inverter per se. The auto shut down circuit controls current passing through the primary of a transformer, the secondaries of which are used to gate two SCRs which form half of the full wave bridge rectifier. If the sensed parameter of the inverter circuit exceeds normal operating limits, the auto shut down circuit shunts current away from the primary winding. The absence of current in the primary winding prevents conduction of the SCRs in the bridge, and as a consequence the bridge becomes open circuited. Accordingly, the auto shut down circuit removes the power to the inverter. Contrary to the prior art, the present invention provides shock protection and inverter disabling by actually disconnecting the power lines from the inverter per se. More particularly, the power lines to the inverter are supplied from a full wave bridge however, this bridge includes only two diodes; the other two elements to the bridge are SCRs. The SCRs in turn are triggered by windings coupled to a primary winding. When the need for automatic shut down is detected, the current through the primary winding associated with the secondaries driving the SCRs is shunted. In this condition, the bridge presents an open circuit so that the AC lines at the inverter per se are unpowered during a shut down condition. There is no power penalty by using the apparatus of the present invention since, in the absence of a shut down condition, the voltage drop across the SCRs (when conductive) is no greater than the voltage drop across a corresponding diode.

Finally, another improved aspect provided by the invention is improved starting of conventional fluorescent lamps. The primary thesis of this improved starting operation is that fluorescent lamps can be started so as to achieve an unenergized/energized transition which exhibits characteristics similar to that of an incandescent lamp. More particularly, the period exhibited in some prior art circuits between energization of the lamps and arcing or ionization which was devoted to "warming" the filaments is eliminated. In other words, operating voltage and current is applied to the lamps and the filaments in their "cold" condition. Furthermore, super high voltage and current (relative to normal operating parameters) is initially applied to the lamps. This has proven to provide effective starting in a period of between 50 and 100 milliseconds from energization. A timing component of the automatic filament switch removes current to the filaments approximately 100 milliseconds after energization. One of the reasons for the perceptible delay in the energization of conventional fluorescent lamps is the procedure used in many prior art circuits which first "warms" the filaments by passing current therethrough prior to actually applying sufficient voltage to induce ionization or arcing. I have found that this delay is entirely superfluous and can be eliminated without harm to the lamps. Furthermore, I have found that applying "super" voltages and current magnitudes to the lamp filaments enhances rapid starting. More particularly, while a typical lamp filament operating voltage may be 3.6 volts and typical lamp operating current may be 0.4 amps, in accordance with the present invention I initially apply voltages and currents substantially in excess of operating value in order to provide for "rapid" starting. In accordance with an example described in this application, I use approximately 13 volts across each lamp filament and 5 amperes of current or more. These super high voltages and currents are applied for a very brief period, no more than the 50–100 milliseconds during which lamp starting occurs. This period is so short that it is hardly perceptible to the user. Once the lamp is ionized, the voltages and currents applied thereto drop to operating values and the current supply to the filaments is removed. The particular voltage and current levels are exemplary, but in accordance with the invention I use voltages and currents which are substantial multiples, by at least a factor of 3, above typical operating values.

BRIEF DESCRIPTION OF THE DRAWINGS

The present invention will now be further described in the following portions of this specification so as to enable those skilled in the art to make and use the same when taken in conjunction with the attached drawings in which:

FIG. 3 is an alternate embodiment of the automatic filament switch 106 which operates off the voltage from the inverter 104 in lieu of a timed operation;

FIGS. 4, 5, 6, 7, and 8 are alternate embodiments of circuit components comprising the saturable core T4, the windings thereon and the switches Q1 and Q2, as well as the control for rendering conductive a non-conductive one of the switches.

DETAILED DESCRIPTION OF PREFERRED EMBODIMENT

Figure 1:
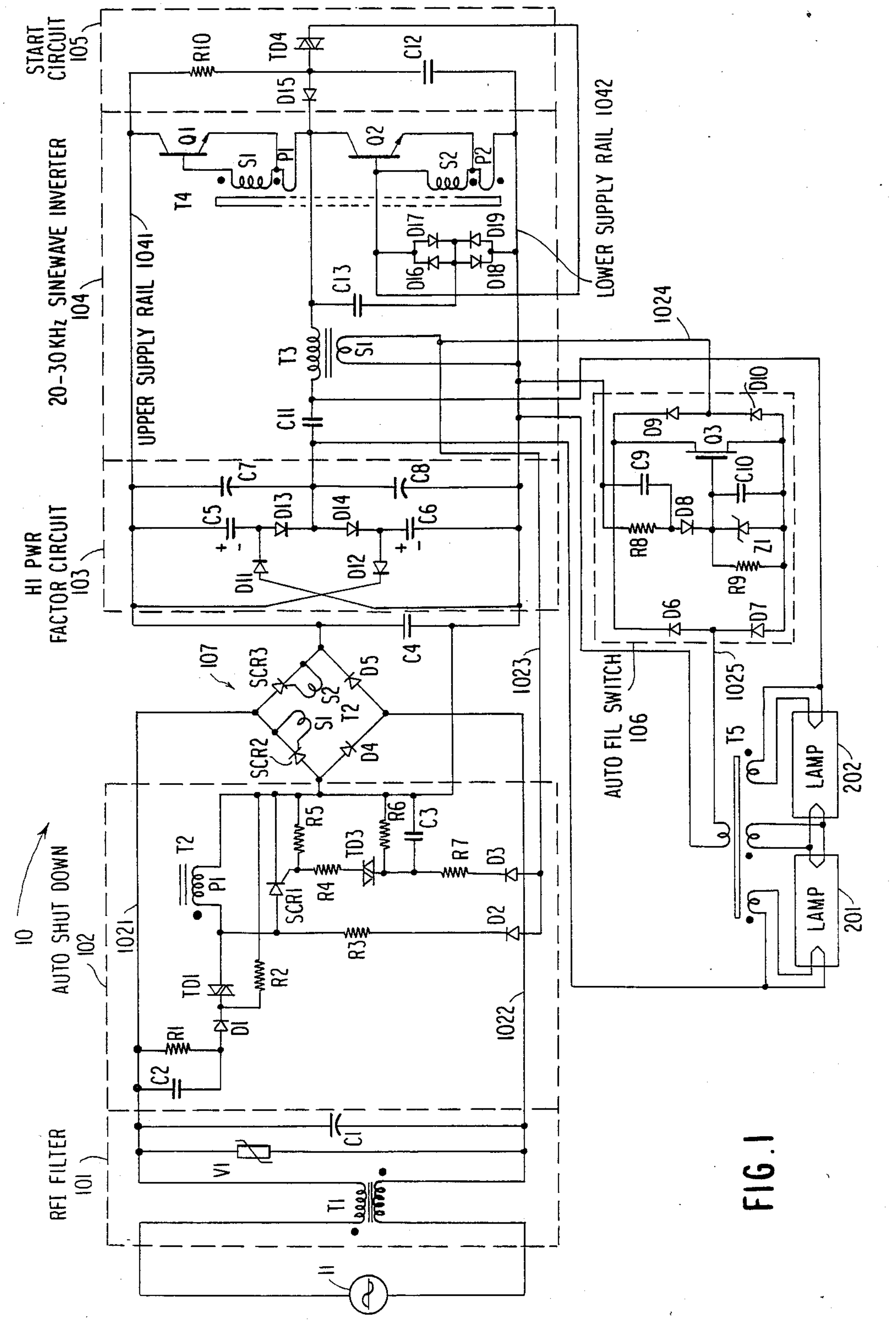
FIG. 1 is a schematic of a preferred embodiment of the present invention.

A preferred embodiment of the invention comprises circuitry 10 for powering conventional fluorescent lamps 201, 202 as shown in FIG. 1. The preferred embodiment of the circuit 10 is, as illustrated in FIG. 1, coupled to a conventional alternating power source 11. The circuit 10 includes the RFI filter 101, an auto shut down circuit 102, a full wave bridge rectifier 107, a high power factor circuit 103, the inverter 104, a starting circuit 105, an auto filament switch 106 and a filament transformer T5. Although FIG. 1 shows the circuit powering representative lamps 201 and 202, it should be apparent that the number of lamps actually powered can be varied within relatively wide limits.

Power from the source 11 is coupled via the RFI filter and the transformer T1 therein, via conductors 1021 and 1022, to input terminals of a bridge rectifier 107. The output terminals of the bridge rectifier 107 provide power to an upper supply rail 1041 and a lower supply rail 1042.

A first series circuit is connected across the power rails 1041 and 1042; this series circuit includes a first switch, transistor Q1, connected to a primary winding P1 wound on the core T4. The primary winding P1 also connects to a second switch, transistor Q2. Transistor Q2 is also connected to a second primary winding P2, also wound on the core T4. Finally, the second primary P2 is connected to the lower supply rail 1042.

A second series circuit is coupled across the supply rails 1041 and 1042, including the capacitors C7 and C8, connected in series. A third series circuit is also connected across the supply rails 1041 and 1042. The third series circuit is a serial connection of a first circuit comprising capacitor C5 and a serially connected diode D13, and a second circuit including diode D14 and a serially connected capacitor C6. The first circuit component of the third series circuit is connected to a diode D11 which is also connected to the lower supply rail 1042. Likewise, the second circuit component of the third series circuit is connected to a diode D12 which is also connected to the upper supply rail 1041. Connected between the junction of capacitor C7 and C8 on the one hand, and the junction of primary winding P1 of the core T4 and the transistor Q2 on the other hand, is a series resonant circuit comprising the capacitor C11 and the primary winding of a transformer T3.

The load circuit, comprising the lamps 201 and 202, is connected across the capacitor C11 portion of the series resonant circuit.

In the auto shut down circuit 102, the AC power on conductors 1021 and 1022 is input to the input terminals of the bridge rectifier 107. A signal relating to the voltage developed in the series resonant circuit is provided from the secondary S1 of the transformer T3 and coupled to the anodes of diodes D2 and D3 via the conductor 1023.

A circuit means is used to develop a drive signal for the SCRs, SCR2 and SCR3, which are each respectively connected to secondaries S1 and S2 of a transformer T2. The primary winding of the transformer T2 is connected in a circuit connected to the conductor 1021 comprising the capacitor C2 and the resistor R1 in parallel connected to the anode of a diode D1 whose cathode is coupled to one terminal of a diac TD1 and to one terminal of a resistor R2. The other terminal of the diac TD1 is connected to one terminal of the primary winding of the transformer T2. The other terminal of the primary winding of transformer T2 is connected to the anode of SCR2 and to the other terminal of a resistor R2. A resistor R3 is connected to the junction between the primary winding of transformer T2 and the diac TD1. The other terminal of the resistor R3 is connected to the cathode of the diode D2 whose anode is connected to the conductor 1023. As will be described, on application of power the drive signal is developed in the secondaries S1 and S2 of the transformer T2 to alternately allow the SCRs, SCR2 and SCR3, to conduct to provide a rectified output from the bridge 107. Initially the drive signal is provided via the capacitor C2, the diode D1 and the diac TD1. After the inverter 104 has been initiated into operation, the drive signal developed in the transformer T2 is maintained from the diode D2, the resistor R3 and the secondary S1 of transformer T3.

The auto shut down circuit 102 further includes a switching means for, under certain circumstances, inhibiting the drive signal. The switching means includes the diode D3, the resistor R7 connected thereto, the diac TD3 connected to the resistor R7, the resistor R4 connected between the control terminal of the SCR1 and TD3. The SCR1 is connected to the junction between the resistor R3 and the diac TD1 on the one hand, and to the junction of the primary winding P1 of transformer T2 and the resistor R2 on the other hand. A capacitor C3 and resistor R6 are connected in parallel with the series circuit including TD3, R4 and R5. As will be described below, in the event that the sense signal in the conductor 1023 rises beyond the threshold sufficient to initiate diac TD3 into operation, the SCR1 is triggered into conduction to in effect short circuit the primary P1 of transformer T2, thereby inhibiting the drive signal to the secondaries S1 and S2 of the transformer T2.

The main conduction path of the first switch, transistor Q1, is connected on the one hand to the upper supply rail 1041, and on the other hand to a terminal of primary winding P1, wound on the core T4. The other terminal of this primary winding P1 is connected in the main conduction path of the second switch, transistor Q2. The other terminal of the main conduction path of the second switch, transistor Q2, is connected to one terminal of the primary P2 wound on the core T4. The other terminal of the primary P2 is connected to the lower supply rail 1042.

The control terminal of the first switch, transistor Q1, is connected to one terminal of a secondary S1 wound on the core T4, and the other terminal of the secondary S1 is connected to the junction between one terminal of the primary winding P1 and the main conduction path of the first switch, transistor Q1. In a similar fashion, the control terminal of the second switch, transistor Q2, is connected to one terminal of a secondary S2 wound on the core T4. The other terminal of the secondary S2 wound on the core T4 is connected to the junction between the primary P2 and the main conduction path of the second switch, transistor Q2. The main conduction path of the second switch, transistor Q2, is coupled to the lower supply rail 1042 via the primary P2.

The four windings, primaries P1 and P2 and secondaries S1 and S2, all wound on the core T4, are tightly coupled with the dot conventions showing their polarity. The core T4 is saturable during normal operation of the inverter and its saturation is used to control the conduction period of the first and second switches, transistors Q1 and Q2, respectively.

More particularly, the windings P1 and S1 on the one hand, and P2, S2 on the other hand, are arranged to provide positive feedback between current flowing in the main conduction path of either the first or the second switches, and the control terminal of the same switch. Accordingly, as a switch is rendered conductive, the effect of current flowing in the main conduction path is multiplied by the positive feedback to reinforce that conduction via a drive signal which is developed in the respective secondary. This process continues until the core T4 saturates, whereafter the drive signal terminates. While the drive signal terminates, however, as is known, conduction in the transistor does not terminate until the minority carriers have been evacuated, which process is assisted by the secondary windings (either S1 or S2) connected to the control terminals of the respective first and second switches, transistors Q1 and Q2, respectively.

As those skilled in the art are aware, especially with a series resonant inverter, it is important that the switches conduct alternately and not in overlapping time periods. A control means is provided to inhibit the forward biasing of a non-conducting one of the switches for a time sufficient to ensure that the non-conducting one of the switches is not rendered conductive until conduction has ceased in the other of the switches. This control means comprises the diodes D16 through D19 connected on the one hand to the lower supply rail and on the other hand to the control terminal of the second one of the switches, transistor Q2. The junction between the diodes D16 and D18 on the one hand, and diodes D17 and D19 on the other hand, is coupled via a capacitor C13 to the series resonant circuit, particularly to one terminal of the primary winding of transformer T3. The control means actually clamps to a voltage offset from the lower supply rail 1042 so long as current in the series resonant circuit is changing. This action, as will be described below, inhibits conduction of the non-conducting one of the switches, and the clamping and inhibition only terminate on termination of current flow variations. While FIG. 1 illustrates a preferred embodiment of this control operation, other embodiments are shown in FIGS. 4–8.

The high power factor circuit improves the power factor of the circuit shown in FIG. 1 by charging capacitors C5 and C7 on the one hand, and C6 and C8 on the other hand, via high frequency inverter current, and performs this function without increasing the current drawn by the inverter merely for this purpose.

More particularly, it should be apparent that during conduction of the first switch, transistor Q1, the conduction path is from the upper supply rail 1041 through the transistor Q1 and the primary winding P1, through the series resonant circuit including the primary of transformer T3 and the capacitor C11 and from there, through the parallel combination of capacitor C8 on the one hand and the series circuit of diode D14 and capacitor C6 on the other hand. Accordingly, both capacitors C8 and C6 are charged by high frequency inverter current. Likewise, when the second switch, transistor Q2, conducts, the current path is from the upper supply rail 1041 through the parallel combination of C7 on the one hand and the series circuit of capacitor C5 and D13 on the other hand, then through a series resonant circuit comprising capacitor C11 and the primary winding of transformer T3, then through the second switch, transistor Q2 and through the primary winding P2 wound on core T4 to the lower supply rail 1042.

By properly choosing C7 and C8 on the one hand and C5 and C6 on the other hand, a voltage will be developed across C5 and C6 which will average greater than 50% of the peak value of the unfiltered AC output from the bridge 107. The voltages developed across C5 and C6 are, at the appropriate times, coupled to the supply rails by the diodes D11 and D12 during periods when the unfiltered AC across the capacitor C4 is less than the voltage across the capacitors C5 and C6, respectively. Since the charging of the capacitors C5 and C6 is effected at the high frequency rate of the inverter, the average current seen at the power source 11 reflects a high power factor of typically 0.94 for a 40 kHz inverter operating with two 40-watt rapid start lamps. In one embodiment diodes D11 and D12 are 1N4006, diode D13 and D14 are MR814, capacitors C5 and C6 are 22 mfd/200 volts and capacitors C7 and C8 are 0.22 mfd/250 volts. Those skilled in the art will recognize that other component values could be selected without departing from the present invention.

OPERATION

As shown in FIG. 1, power is supplied from a suitable 50–60 Hz conventional AC power source 11 and applied to the RFI filter 101 in order to suppress line noise and transients. The output of the RFI filter 101 is applied on conductors 1021 and 1022 to the input terminals of a full wave bridge rectifier 107 consisting of diodes D4 and D5 along with SCR2 and SCR3. When power is first applied, capacitor C2 will begin to charge on positive half cycles through D1, R2 and D4. This charging current will raise the voltage across R2 until the threshold level of diac TD1 is reached. TD1 will then conduct the charge accumulated on capacitor C2 through the primary winding P1 of transformer T2 and D4 to the conductor 1022. Current flowing in the primary of transformer T2 will produce positive pulses on the secondaries S1 and S2 which are applied to the gates SCR2 and SCR3. Due to the polarity of the windings, SCR3 will conduct for the remainder of the positive half of the input cycle. In this fashion, voltage is applied to the upper and lower supply rails 1041 and 1042. Assuming oscillation of the inverter begins at this time (as will be explained), a high frequency voltage will appear on the secondary S1 of the transformer T3. The secondary S1 of the transformer T3 is connected on the one hand to the lower supply rail 1042, and on the other hand via the conductor 1023 to the anodes of diodes D2 and D3. The voltage on the conductor 1023 is related to the voltage developed in the series resonant circuit. Component values are selected so that, with normal inverter operation, the voltage applied by the cathode of diode D3, through the resistor R7 to the diac TD3 will be inadequate to cause it to conduct and consequently the SCR1 will be non-conductive. Current flow from the secondary S1 of the transformer T3, through the conductor 1023, diode D2, resistor R3 through the primary P1 of the transformer T2 to the lower supply rail 1042 will maintain a continuous succession of pulses to the gates of SCR2 and SCR3, keeping them in alternate conducting states to allow for normal operation of the full wave bridge 107. Simultaneously, capacitor C2 will charge to a level nearly equal to the positive peak of the AC input voltage on conductor 1021. Resistor R1 is selected to be sufficiently high in value to allow negligible discharging of capacitor C2 during negative half cycles. In this condition, diac TD1 remains non-conducting for the remainder of the time that power is applied. When power is removed, however, R1 will discharge C2 so as to leave the circuitry in a condition for the next power on cycle.

Inverter Operation

When power is first applied and the rectifier 107 applies voltage to the upper and lower supply rails 1041 and 1042, respectively, the resistor R10 begins to charge the capacitor C12. When capacitor C12 is charged to the level required to trigger diac TD4, the charge accumulated in capacitor C12 will be conducted to the base of the second switch, transistor Q2. Transistor Q2 then begins to conduct a small amount of current from the upper supply rail 1041, the parallel combination of capacitor C7 on the one hand, the series circuit of capacitors C5 and D13 on the other hand, through capacitors C11, the primary winding of the transformer T3, through the transistor Q2, and the primary winding P2 to the lower supply rail 1042. The polarity of the windings P2 and S2 wound on core T4 is selected so as to provide positive feedback from the main conduction path of the switch Q2 to the control terminal, the base of transistor Q2. Because of this positive feedback, current flowing in the transistor Q2 increases and quickly forces transistor Q2 into saturation. Thus the current through the transistor Q2 increases in a sinusoidal fashion until T4 saturates nearly at the time the resonant current approaches zero. Parameters are selected so that the time necessary for T4 to saturate is slightly less than the natural resonance determined by the inductive and capacitive parameters of the series resonant circuit. More particularly, the core of T4 is initially of such a size that core T4 will not saturate at an appropriate time, i.e. it saturates too late. However, after a circuit is constructed, the core area of T4 is reduced so as to bring about saturation at the appropriate time. When the switch Q2 ceases conduction, current through the series resonant circuit (C11 and the primary of T3) begins to reverse direction through the parallel combination of C8, C6 and D14. Accordingly, the collector voltage on Q2 begins to increase in a positive direction due to the collapsing field of the primary of T3. C13 now begins to conduct current through D18 to the lower supply rail 1042. This results in a slower rise of collector turn off voltage at transistor Q2 then would be seen without C13. The net effect is lower dissipation in the transistor Q2 due to the time needed for both major and minor carriers to evacuate. At this time, conduction by the first switch, transistor Q1, is inhibited by the clamping action of D16 on secondaries S2 and S1 of the core T4 as follows. The secondaries S1 and S2 wound on T4 are bifilar and are therefore tightly coupled. As current flows through C13 and D18 during the positive ramp of the collector voltage of Q2, the voltage on the anode of D18 is approximately 0.75 volts, referenced to the lower supply rail 1042. Since the switch 1, transistor Q1, is next to conduct, the dotted ends of the secondaries S1 and S2 must supply positive current to the base of Q1 or, in other words, the non-dotted ends of the secondaries S1 and S2 must go negative. This operation is prevented by the diode D16 which clamps the negative current on secondary S2 at approximately zero volts in reference to the lower supply rail 1042. As a result there would be approximately no voltage across the secondaries S1 and S2. In other words, conduction of the non-conducting one of the switches (Q1 at this time) is inhibited by reason of the current variation in the series resonant circuit, as reflected by current flowing through C13. This condition will be maintained until the rising collector voltage of transistor Q2 reaches approximately a level of the upper supply rail 1041. At this point, current through C13 ceases. Accordingly, the clamping action of the diode D16 now ceases, i.e. the inhibition on conduction of transistor Q1 is removed. Due to the small but finite leakage inductance of the core T4, transient ringing previously inhibited by D16 produces a small positive current at the base of the first switch, transistor Q1, which is reinforced by the positive feedback between the winding P1 and the main conduction path of the first switch. Accordingly, transistor Q1 saturates and the current through Q1 now increases sinusoidally. The cycle continues in the fashion already described with respect to the second switch, transistor Q2, and when the current returns to zero, the first switch, transistor Q1, will cease to conduct and the inhibiting operation enabled by the capacitor C13, but now with respect to diodes D19 and D17, will again clamp the windings S1 and S2 of T4 until the voltage at the collector of Q2 reaches the lower supply rail 1042. This will terminate current through C13 and thus remove the inhibition on conduction of the second switch, transistor Q2. Accordingly, transistor Q2 now begins to conduct and the cycle begins again. The alternate conduction of the first and second switches, transistors Q1 and Q2 generates high frequency AC voltage across C11 and T3, increasing with each cycle. With the inverter now oscillating, diode D15 will keep C12 discharged to a level which will prevent TD4 from any further conduction.

Operation of Automatic Shut Down Circuit

The purpose of the automatic shut down circuit 102 is to provide open circuit protection to prevent damage to the inverter as well as to prevent shock to an installer or maintenance person during relamping of a fixture with the power on. If during normal operation a lamp is removed or becomes open, or if no lamp exists during power on, the voltage across the secondary of T3 will continue to increase and will reach a positive peak value for a sufficient period of time to allow the current through D3 and R7 to charge C3 to a level which allows TD3 to conduct. When TD3 begins conduction, the charge from capacitor C3 is conducted through resistor R4 to the gate of SCR1. SCR1 will now begin to shunt the current which had previously existed in the primary of the transformer T2. The shunting of this current removes the drive signal from SCR2 and SCR3. Accordingly, SCR2 and SCR3 will cease to conduct. This opens the bridge 107 so that voltage is no longer supplied to the upper and lower supply rails 1041 and 1042 and the inverter's operation will terminate. Note that the input voltage, on conductors 1021 and 1022 is prevented from reaching the inverter or the rails 1041 and 1042 so that the input power is effectively disconnected from the inverter.

The operation of the circuit which follows this condition depends on the relation between resistors R1 and R2.

During normal operation (with the normal shut down circuit unoperated, and current flowing through the primary of transformer T2), the capacitor C2 tends to be charged on each positive half cycle and discharges slowly on negative half cycles through the resistor R1. If the discharge of capacitor C2 on negative half cycles is inadequate to induce conduction in the diac TD1, then after operation of the automatic shut down circuit, the SCRs, SCR2 and SCR3, will not be retriggered until the AC source 11 is interrupted for a sufficient period of time to allow the resistor R1 to discharge the capacitor C2 to a suitable level to allow triggering of TD1 when power is reapplied. On the other hand, if the resistor R2 is chosen so as to discharge C2 during negative half cycles sufficient to allow TD1 to conduct, on positive half cycles, the inverter will attempt to restart during fault conditions without interrupting the supply 11. Accordingly, the relationship between R1 and R2 is selected dependent on whether it is desired for the circuit to attempt to restart during a fault condition.

Automatic Filament Switch 106

The automatic filament switch 106 and the associated circuitry provides a new technique for operating so-called "rapid start" lamps such as T12 lamps. The automatic filament switch 106 is a gated bridge which passes AC current from the secondary of the transformer T3 to the filaments of the lamps 201 and 202 via the transformer T5. In contrast to prior art techniques which typically attempted to first heat the filaments before applying operating potentials and then only supply voltage and current in the typical operating range to "start" the lamp, the automatic filament switch 106 does not attempt to "warm" the filaments and super high voltage and current is applied to the filaments in their "cold" condition. As the inverter 104 begins to operate, the voltage on the secondary S1 of the transformer T3 is stepped sinusoidally and rapidly increases in amplitude. During one half of the cycle, when the voltage on the lower supply rail 1042 is negative, and the voltage on conductor 1024 is more negative than that on the lower supply rail 1042, capacitor C9 begins to charge over a current path from lower supply rail 1042 through the capacitor C9 in parallel with the resistor R8, the diode D8 and the capacitor C10 or the resistor R9, in parallel, and the diode D10. During the other half cycle, when the voltage on supply rail 1042 is positive and the voltage on conductor 1024 is even more positive, C9 is not charged. After several cycles, the voltage on capacitor C9 is sufficient to enable FETQ3 to conduct. Once FETQ3 begins conduction, current flows (during one half of the cycle) from the lower supply rail 1042 through the primary of transformer T5, through the diode D6, the FETQ3 and the diode D10 to conductor 1024. On the opposite half cycle, the charge on the capacitor C10 maintains the FETQ3 enabled for conduction. During this half cycle, current flows from the conductor 1024, through the diode D9, the switch FETQ3, the diode D7 and through the primary of the transformer T5 back to the lower supply rail 1042.

In a preferred embodiment of the invention, after the few cycles required before the FETQ3 begins conducting, the voltage supplied to the primary of the transformer T5 is approximately 26 volts peak. The secondaries are wound to transmit a corresponding (i.e. equal) voltage to the lamp filaments and this voltage is applied with the filaments in a "cold" state where they have resistance of approximately 2 ohms. This condition therefore results in a peak current of around 13 amperes. This compares with the ANSI recommended filament current for normal operation of 0.4 amperes. However, the relatively high voltage and current initiates arcing or ionization in the lamp in a very rapid fashion. In a preferred embodiment with conventional fluorescent lamps operating at about 25° C., starting occurs in about 50 milliseconds from the beginning of inverter operation. Once the lamps have ionized, the voltage applied across the lamps drops to about 50% of the peak voltage applied to the lamps during the starting operation. This reduction in voltage results in removing the charge in the capacitors C9 and C10 to the point where they are no longer able to maintain the FETQ3 conducting. Accordingly, conduction through FETQ3 terminates. This action terminates current flow through the automatic filament switch 106 and hence current flow in the filaments terminates.

In the event that the lamps do not ionize and conduct, as the charge builds up on capacitor C9 (with a time constant determined by the value of capacitor C9 and resistor R9), the voltage available on the gate of FET switch Q3 will force the turn off of the switch in about 200 milliseconds timed from the beginning of inverter operation.

Figures 2A, 2B, 2C, 2D:
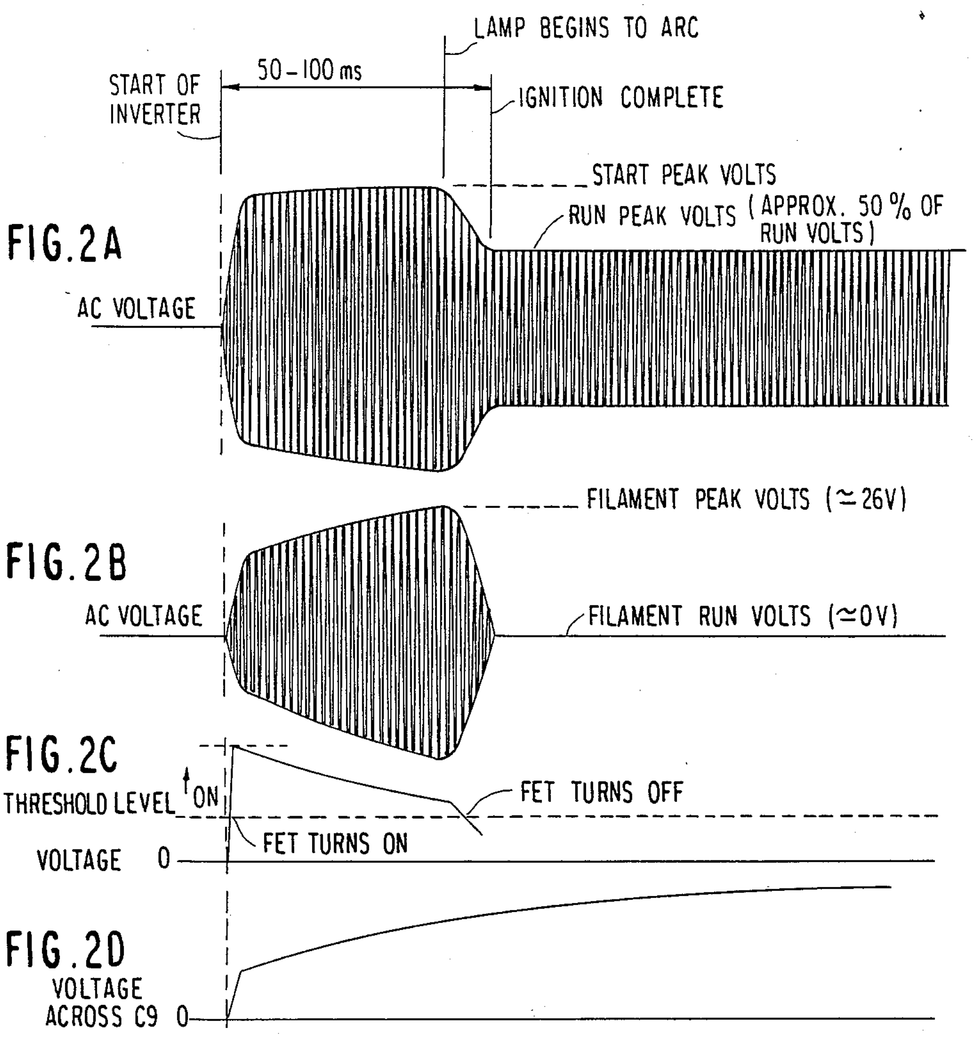
FIGS. 2A–2D illustrate waveforms useful in describing operation of the automatic filament switch 106 and the associated energization and deenergization of a lamp filament.

FIGS. 2A–2D show the waveforms in connection with the foregoing description. More particularly, the waveform of FIG. 2A shows the voltage between conductors 1024 and 1042; the waveform on FIG. 2B shows the voltage across conductors 1024 and 1025. The waveform of FIG. 2C shows the voltage on the gate of FETQ3 and the waveform of FIG. 2D shows the voltage across the capacitor C9. All of the waveforms are drawn for typical operation in which lamp starting occurs between 50 and 100 milliseconds after beginning of inverter operation and the FETQ3 is turned off by the reduction in voltage caused by lamp ionization and normal operation.

FIG. 4 is an extract of FIG. 1 showing the inverter 104; the figure is useful in comparison with FIGS. 5–8 which are variants on the inverter of FIG. 4.

FIG. 5 shows an alternative version for the use of the single core, as a saturable transformer for control of the conduction. FIG. 5 shows the inverter component corresponding to the inverter 104 of FIG. 1, omitting the starting circuit 105, the high power factor circuit 103, the bridge 107, the auto shut down circuit 102, the RFI filter 101, the auto filament switch 106 and the load, although in practice these elements are connected to the circuit of FIG. 5 just as they had been connected in the circuit of FIG. 1. The same reference characters are used on the elements of FIG. 5 where they are identical or similar to the elements used in FIG. 1. Furthermore, the inductor L in FIG. 5 represents the primary winding of the transformer T3 of FIG. 1. The upper power rail 1041 is connected to a center tap of the transformer XFMR whose terminals are connected to the series resonant circuit consisting of the inductor L and the capacitor C11. The collectors of the switches Q1 and Q2 are connected to the junction of the series resonant circuit and the terminals of XFMR. The capacitor C13 is connected to the injunction between the inductor L and a terminal of XFMR, and to terminals of the diodes D16–D19. The circuit of FIG. 5 operates in a manner very similar to the operation of the circuit shown in FIG. 1. More particularly, tight coupling between the windings P1, S1 on the one hand, and P2, S2 on the other hand, provide positive feedback between the main conduction path of a switch (either Q1 or Q2) and the control terminal of that switch. Near the end of a conduction period of either of the switches, the voltage variations at the series resonant circuit produce a current flowing through the capacitor C13 which serves to clamp the control terminal of the switch Q2 referenced to the lower supply rail 1042. This clamping action is reflected through all of the windings P1, S1; P2, S2. It is important at the windings S1 and S2, since it prevents or inhibits conduction of the other of the switches. It is not until the voltage transition terminates that the clamping action is removed along with the inhibition to conduction. The use of the single core for the transformer T4 produces a number of effects. In the first place, the relationship between a conduction cycle of either of the switches (which is controlled by the saturation of the core) can be controlled by tweaking or trimming the area of the core. Furthermore, since only a single core is used, there is no requirement to match the core area of two different cores, as would be the case if two different transformers, and thus two separate cores, had been used as in some prior art circuits.

Figure 6:
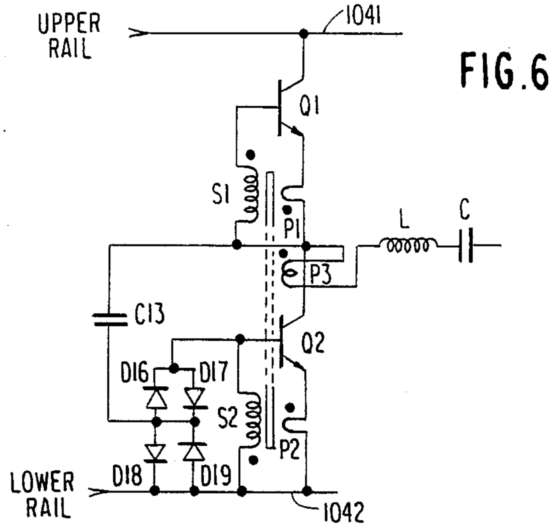

The circuit of FIG. 6 shows an other alternate employing the same principle. The circuit of FIG. 6 differs from the circuit of FIG. 1 in that one terminal of the winding S1 is not connected to a terminal of the winding P1, but rather is referenced to the series resonant circuit. Likewise, the winding S2 is not connected to a terminal of the winding P2, but rather is referenced to the lower supply rail 1042. Furthermore, the transformer T4 includes a fifth winding P3 serially connected in the series resonant circuit.

Figure 7:
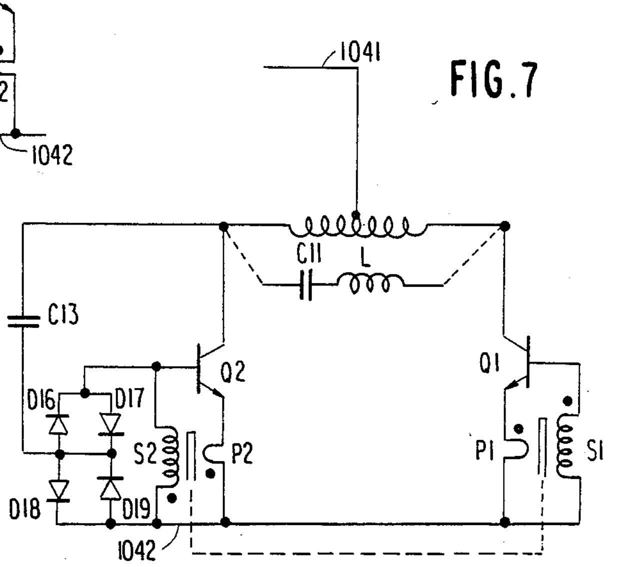

FIG. 7 is still a further variation which in some respects is similar to FIG. 5, although in this case the windings S1 and S2 are referenced to the lower supply rail 1042 and not connected to a terminal of the primary windings P1 or P2, respectively.

Figure 8:
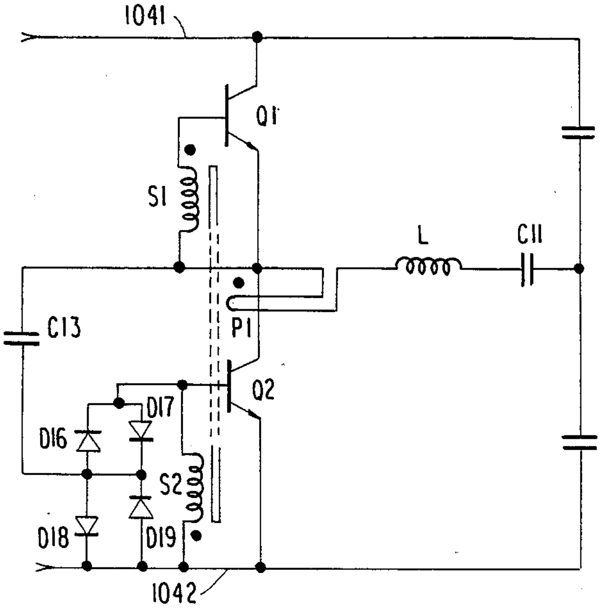

FIG. 8 is still a further variation. The circuit of FIG. 8 differs from that of FIG. 1 in that only three windings are used on the transformer T4. Those three windings include the secondaries S1 and S2 (similar to the connections of those secondaries shown in FIG. 6) and a single primary winding P1 which is connected in series with the series resonant circuit.

FIG. 3 is a variant of the automatic filament switch 106 shown in FIG. 1. In contrast to the timing action exhibited by the automatic filament switch 106, the automatic filament circuit of FIG. 3 relies strictly on level sensing of the inverter voltage for turn on and turn off. More particularly, the conductor 1025 is connected to the cathode of a diode D20 and zener diode Z2 as well as the anode of SCR5. Conductor 1024 on the other hand is connected to the cathode of diode D21, the cathode of zener diode Z3 and the anode of SCR6. The anodes of diodes D20 and D21 are connected to the cathodes of SCR5 and SCR6. The gate terminal of SCR5 is connected to the anode of zener diode Z2 and to one terminal of a resistor R. The other terminal of the resistor is connected to the anode of the zener diode Z3 and to the gate terminal of SCR6. It should be apparent from inspection of FIG. 3 that, at a suitable voltage (on either conductor 1024 or 1025) the associated zener diode will break down, providing current to the gate terminal of the associated SCR (either SCR5 or SCR6). Resulting conduction of the SCR will enable current to flow to either conductor 1024 or 1025. In other words, the automatic filament switch of FIG. 3 is bidirectional. The automatic filament switch of FIG. 3 does not provide a timed turn off of current and thus is susceptible to long term heating in the event of a nonfired lamp.

It should be apparent from the foregoing that many changes can be made to the preferred embodiment shown in FIG. 1 within the spirit and scope of the invention which is accordingly to be construed by the claims attached hereto.

I claim:

1. An efficient, high power factor series resonant inverter comprising:

a source of rectified voltage coupled to a pair of output terminals, first and second power rails, each rail fed from one of said output terminals, a direct drive inverter with a series resonant circuit including first and second electronic switches, each with a main current conduction path terminating in first and second terminals and a control element including a control terminal, said main conduction paths of both said electronic switches coupled to said power rails, said direct drive inverter further including:

saturable means to provide drive current to said first and second electronic switches for establishing a conduction condition for each of said first and second electronic switches, said drive current terminating on saturation of said saturable means, said saturable means including a four winding saturable inductor wound on a single core, all of said windings, wound on said single core, tightly coupled to each other, said four winding saturable inductor having a saturation period no greater than half a period corresponding to a resonant frequency of said series resonant circuit, first means connecting said first electronic switch to a first pair of windings on said single core to provide positive feedback between said main conduction path of said first electronic switch and said control element of said first electronic switch, second means connecting said second electronic switch to a second pair of windings on said single core to provide positive feedback between said main conduction path of said second electronic switch and said control element of said second electronic switch, control means responsive to variations in current flow through a conducting one of said electronic switches for inhibiting forward biasing of a non-conducting one of said electronic switches.

2. Apparatus as recited in claim 1 wherein said control means comprises:

a first pair of unidirectionally conducting devices coupled to a control terminal of one of said switches, oppositely poled terminals of said first pair of unidirectionally conducting devices connected to said control terminal of said one of said switches, a second pair of unidirectionally conducting devices coupled to one of said power rails, oppositely poled terminals of said second pair of unidirectionally conducting devices connected to said one of said power rails, and a capacitor connected between said series resonant circuit and those terminals of said first and second pairs of unidirectionally conducting devices not connected to said control terminal of said one of said switches and said one of said power rails.

3. An efficient, high power factor resonant inverter comprising:

a source of rectified voltage coupled to a pair of output terminals, first and second power rails, each rail fed from one of said output terminals, a direct drive inverter and a series resonant circuit, said direct drive inverter including first and second electronic switches, each with a main current conduction path terminating in first and second terminals and a control element including a control terminal, said main conduction paths of both said electronic switches coupled to said power rails, said direct drive inverter connected between said power rails and said series resonant circuit, said direct drive inverter further including:

saturable means to provide drive current to said first and second electronic switches for establishing a conduction condition for each of said first and second electronic switches, said drive current terminating on saturation of said saturable means, said saturable means including a multi winding saturable inductor wound on a single core, a primary winding on said core connected in said series resonant circuit, first means connecting said first electronic switch to a first winding to provide positive feedback between current flowing in said series resonant circuit and said control element of said first electronic switch by inductive coupling between said primary and said first windings, second means connecting said second electronic switch to a second winding to provide positive feedback between current flowing in said series resonant circuit and said control element of said second electronic switch by inductive coupling between said primary and said second windings, said primary, first and second windings tightly coupled to each other, and control means responsive to variations in current flow through a conducting one of said electronic switches for inhibiting forward biasing of a non-conducting one of said electronic switches.

4. Apparatus as recited in claim 3 wherein said control means comprises:

a first pair of unidirectionally conducting devices coupled to a control terminal of one of said switches, oppositely poled terminals of said first pair of unidirectionally conducting devices connected to said control terminal of said one of said switches, a second pair of unidirectionally conducting devices coupled to one of said power rails, oppositely poled terminals of said second pair of unidirectionally conducting devices connected to said one of said power rails, and a capacitor connected between said series resonant circuit and those terminals of said first and second pairs of unidirectionally conducting devices not connected to said control terminal of said one of said switches and said one of said power rails.

5. An efficient, high power factor resonant inverter comprising:

a source of rectified voltage coupled to a pair of output terminals, first and second power rails, each rail fed from one of said output terminals, a direct drive inverter including first and second electronic switches, each with a main current conduction path terminating in first and second terminals and a control element including a control terminal, said first switch having a first terminal connected to a first power rail and said second switch having a second terminal connected to said second power rail, said direct drive inverter further including:

saturable means to provide drive current to said first and second electronic switches for establishing a conduction condition for each of said first and second electronic switches, said drive current terminating on saturation of said saturable means, said saturable means including a multi winding saturable inductor wound on a single core, said multi winding saturable inductor including a first pair of windings tightly coupled to each other and to a second pair of windings, a first winding of said first pair connected between said control terminal and said second terminal of said first electronic switch, a second winding of said first pair connected between said second terminal of said first electronic switch and said first terminal of said second electronic switch, said first and second windings of said first pair polarized to provide positive feedback from said main current path of said first electronic switch to said control terminal of said first electronic switch, said multi winding saturable inductor including said second pair of windings tightly coupled to each other and to said first pair of windings, a first winding of said second pair connected between said control terminal and said second terminal of said second electronic switch, a second winding of said second pair connected between said second terminal of said second electronic switch and said second power rail, said first and second windings of said second pair polarized to provide positive feedback from said main current path of said second electronic switch to said control terminal of said second electronic switch, and control means responsive to variations in current flow through a conducting one of said electronic switches for inhibiting forward biasing of a non-conducting one of said electronic switches.

6. Apparatus as recited in claim 5 wherein said control means comprises:

a first pair of unidirectionally conducting devices coupled to a control terminal of one of said switches, oppositely poled terminals of said first pair of unidirectionally conducting devices connected to said control terminal of said one of said switches, a second pair of unidirectionally conducting devices coupled to one of said power rails, oppositely poled terminals of said second pair of unidirectionally conducting devices connected to said one of said power rails, and a capacitor connected between said series resonant circuit and those terminals of said first and second pairs of unidirectionally conducting devices not connected to said control terminal of said one of said switches and said one of said power rails.

7. An efficient, high power factor resonant inverter comprising:

a source of rectified voltage coupled to a pair of output terminals, first and second power rails, each rail fed from one of said output terminals, a first series circuit including first and second switches connected in series across said rails, a second series circuit comprising a pair of capacitors connected across said rails, a third series circuit comprising first and second circuits connected in series across said rails, each of said first and second circuits comprising a capacitor and a unidirectional conductor connected in series, a junction of said first and second circuits connected to a junction between said capacitors of the second series circuit, and a further unidirectional conductor associated with each of said first and second circuits, each further unidirectional conductor connected between an associated one of the first and second circuits and one of the power rails, a series resonant circuit including a first capacitor and a first inductor, said series resonant circuit having one terminal connected to a junction between said switches and another terminal coupled to a junction of the capacitors of the second series circuit, and a load circuit connected in parallel with at least a portion of said series resonant circuit.

8. A protected resonant inverter comprising:

(a) a source of AC power, (b) a full wave rectifier connected across said source of AC power, said full wave rectifier including controlled rectifier means for conducting in response to a drive signal, (c) a resonant inverter supplied by said full wave rectifier and a load coupled to said resonant inverter, said resonant inverter including means for generating a sense signal related to a voltage in said resonant inverter, (d) circuit means coupled to said source of AC power for generating said drive signal on application of power thereto, (e) switching means coupled to said circuit means and to said sense signal for inhibiting said drive signal when said sense signal has a distinctive characteristic, whereby when said sense signal achieves said distinctive characteristic said switching means inhibits operation of said circuit means to terminate rectification of AC power by said full wave rectifier.

9. A protected resonant inverter as recited in claim 8 wherein said resonant inverter includes a resonant circuit including a first winding, said first winding inductively coupled to a second winding, said means for generating a sense signal includes said second winding and a conductor connecting said second winding to said switching means.

10. A protected resonant inverter as recited in claim 9 wherein said circuit means includes a transformer including a primary and a secondary, said secondary coupled to said controlled rectifier means, and wherein said switching means includes means for short circuiting said primary of said transformer.

11. A protected resonant inverter as recited in claim 9 wherein said controlled rectifier means comprises two controlled rectifiers, said circuit means includes a transformer including a primary and two secondary windings, each of said secondary windings coupled to a different one of said two controlled rectifiers, and wherein said switching means includes means for short circuiting said primary of said transformer.

12. A protected resonant inverter as recited in claim 9 wherein said means for generating a sense signal further includes an RC circuit for driving a gate of a controlled rectifier, said switching means comprising said controlled rectifier.

13. A protected resonant inverter as recited in claim 12 wherein said circuit means includes a transformer with a primary and a secondary winding, said controlled rectifier coupled to said primary to short circuit said primary when said controlled rectifier is in conduction, and said secondary winding is coupled to said controlled rectifier means.

14. A method of rapid starting of conventional fluorescent lamps supplied with power from an inverter, said method comprising the steps of:

providing an R-C charging circuit energized from said inverter, providing a bridge rectifier between a terminal of said inverter and a filament circuit of said fluorescent lamps, providing an FET switch to allow current flow in said bridge rectifier when said FET switch is rendered conductive, initiating said inverter into oscillation, switching said FET switch into conduction by a voltage from said R-C charging circuit, generating a voltage across said filament circuit on the order of 10 volts or more and simultaneously a current into said filament circuit on the order of multiple amperes.

15. A method of rapid starting of conventional fluorescent lamps supplied with power from an inverter, said method comprising the steps of:

(a) generating a voltage across a filament circuit of said fluorescent lamps, while said filament circuit is in a cold condition, on the order of 10 volts or more and (b) simultaneously generating a current into said filament circuit on the order of multiple amperes.

16. A method as recited in claim 15 wherein said generating step comprises:

(a1) providing an R-C charging circuit energized from said inverter, and (a2) providing an FET switch enabled from said R-C charging circuit in a conduction path from a terminal of said inverter to a filament circuit supply so that current flows through said FET switch to said filament circuit supply only after a delay from initiation of inverter operation determined by said R-C circuit and a characteristic of said FET switch.

17. A method as recited in claim 15 comprising the further step of:

(c) terminating current flow to lamp filaments.

18. A method as recited in claims 15–17 which comprises the further step of:

(i) inhibiting current flow to said filaments a predetermined time after filament current begins to flow.

* * * * *